United States Patent Office 2,719,096
Patented Sept. 27, 1955

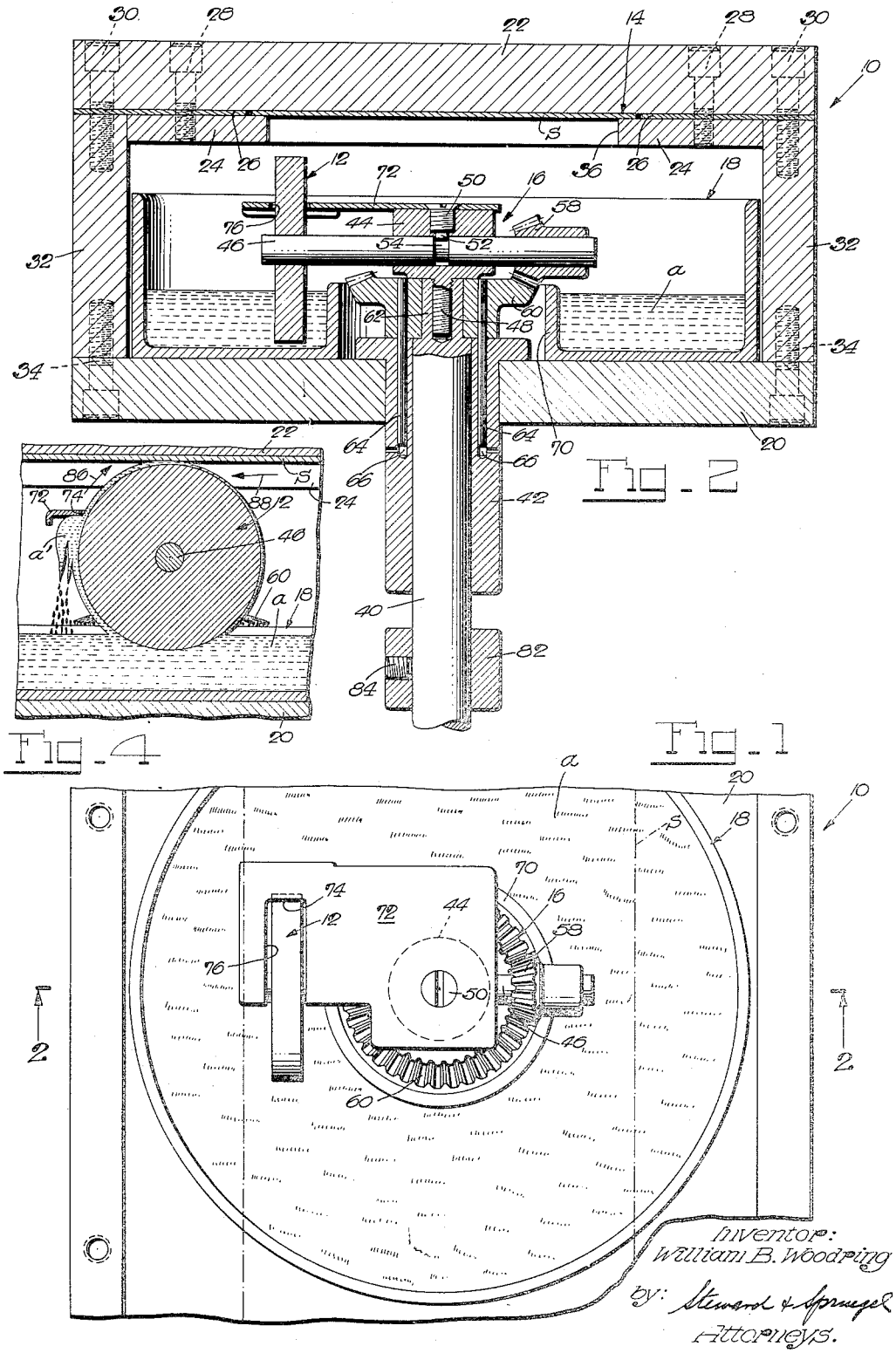

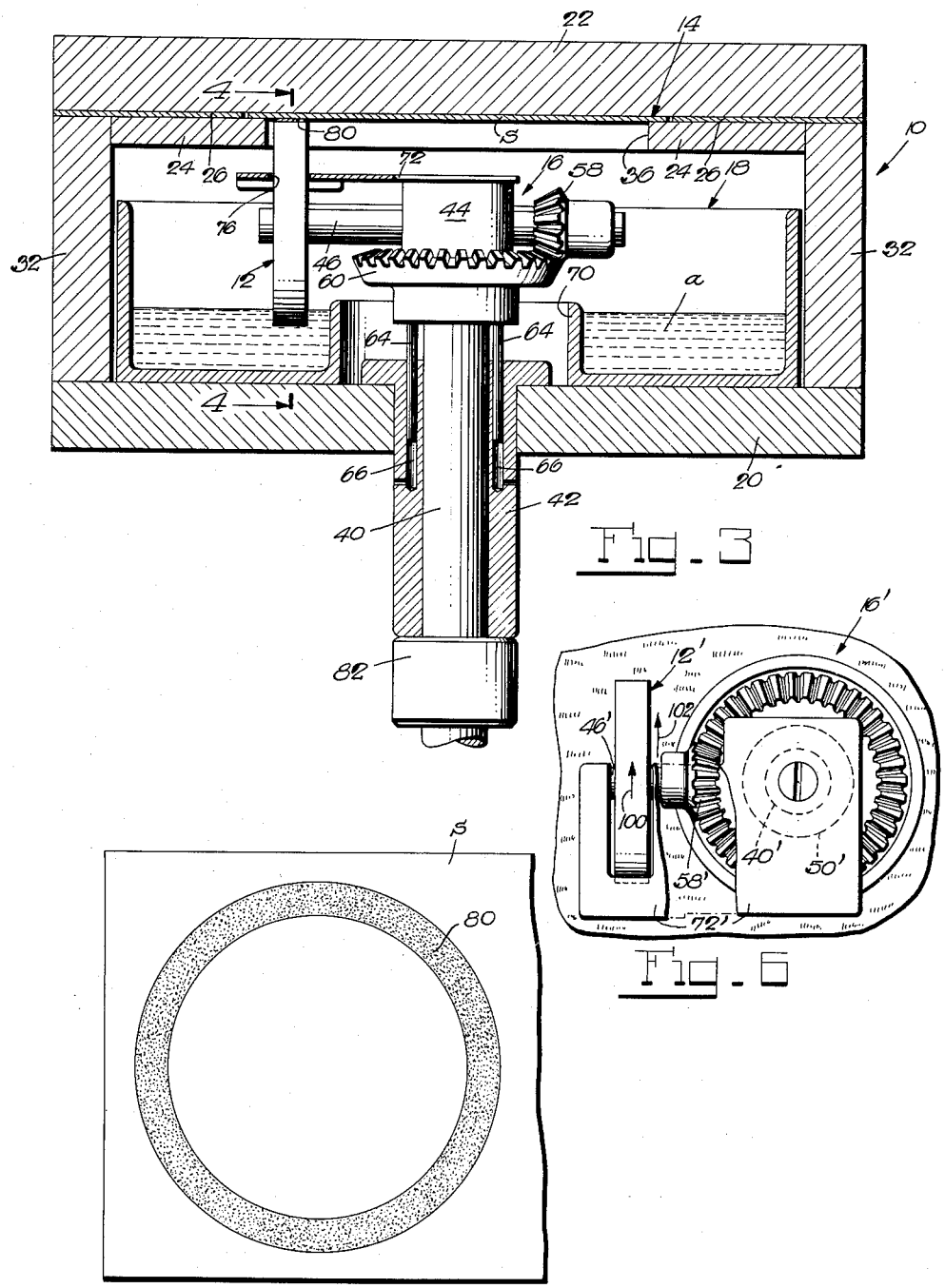

2,719,096

ROLLER ADHESIVE APPLICATOR FOR STRIP OR SHEET MATERIAL

William B. Woodring, Hamden, Conn., assignor to Olin Mathieson Chemical Corporation, a corporation of Virginia Application June 15, 1953, Serial No. 361,698

36 Claims. (Cl. 117—37)

This invention relates to apparatus for and a method of applying adhesive to materials.

Previous adhesive applicators, while generally satisfactory for many purposes, were found inadequate for other purposes. Thus, they proved inadequate where the application of adhesive of accurately controlled thickness, or the uniform application of adhesive to sharply defined areas, or both, are prime requirements. This is due to the fact that the deposition of adhesive on materials by previous applicators varies quite considerably, especially in rapid adhesive application, with the consistency of the adhesive supply which soon changes due to evaporation of the solvent in the adhesive. Thus, as the solvent in the adhesive gradually evaporates, the latter becomes stringy and more gummy and will not be applied as readily by previous applicators than when the adhesive is fresh and, hence, less viscid.

It is an object of the present invention to provide an adhesive applicator unit of a type which will permit the application of adhesive of accurately controlled thickness, or uniform application of adhesive to sharply defined areas, or both, despite the inevitable variations in the consistency of the adhesive supply over a period of time.

It is another object of the present invention to provide an adhesive applicator unit of this type which will permit even exceptionally fast application of adhesive of accurately controlled thickness, or exceptionally fast and nevertheless uniform application of adhesive to sharply defined areas, or both, without having to interrupt the application process at any time except for replenishing an exhausted supply of adhesive.

It is a further object of the present invention to devise a method by which to apply adhesive of accurately controlled thickness to materials, or uniformly apply adhesive to sharply defined areas of materials, or both, without regard to the inevitable variations in the consistency of the adhesive supply.

Another object of the present invention is to provide an adhesive applicator unit of the aforementioned type which will wipe, rather than print, adhesive onto material.

A further object of the present invention is to provide an adhesive applicator unit of the aforementioned type which will wipe adhesive onto progressive portions of material regardless of whether or not the latter is moved.

It is another object of the present invention to provide an adhesive applicator unit of the aforementioned type of which the applicator element is a roller that dips into an adhesive supply and has rotary motion about its own axis as well as bodily motion relative to material to which adhesive is to be applied, thereby to achieve the aforementioned wiping of adhesive onto the material.

Another object of the present invention is to provide an adhesive applicator unit of which the aforementioned roller dips into the adhesive supply with its periphery which is adapted to carry adhesive to and wipe it onto material, and the periphery of the roller is preferably slightly spaced from the material so that the adhesive on the roller is in a sense wedged between the latter and the material and thus forcefully and uniformly applied to the material, and the aforementioned wiping action of the roller is on the adhesive, rather than on the material itself, thereby not only enhancing the forceful application of the adhesive to the material but also achieving a measurable and most uniform thickness of the applied adhesive throughout and also the application of the adhesive to sharply defined areas of the material, and subjecting the material to the negligible internal shearing stresses of the adhesive only and not to any stresses whatever from the acting roller.

It is a further object of the present invention to provide an adhesive applicator unit of the aforementioned type of which the adhesive supply is contained in a fixed reservoir, so that the turning and bodily moving roller agitates the adhesive supply most forcefully and thereby keeps the consistency of the latter substantially constant for a considerable length of time for optimum efficiency of the applicator unit even at exceptionally fast performance of the same.

It is another object of the present invention to provide an adhesive applicator unit of the aforementioned type with a guide in which to feed material past the aforementioned roller, and to mount the roller so that the same may be raised into and lowered from operative relation with the guided material while remaining dipped in the adhesive supply, thereby to permit the application of adhesive to the guided work at spaced intervals thereof.

A further object of the present invention is to provide an adhesive applicator unit of the aforementioned type of which the direction of bodily movement of the roller is preferably opposite to that of the movement of the roller periphery adjacent the material springing from the rotation of the roller, thereby to achieve a highly advantageous so-called "reverse roller coating" of the material with adhesive in which the roller sweeps some of the delivered adhesive before it against the material for most intimate contact between adhesive and material and most forceful application of the former to the latter.

Another object of the present invention is to provide an adhesive applicator unit of the aforementioned type with a wiper blade which is arranged on the adhesive-delivery side of the roller periphery and spaced therefrom to wipe off all adhesive in excess of a predetermined thickness thereof which is best suited for coating the material with an adhesive layer of a desired uniform thickness and/or confining the adhesive layer to a sharply defined area of the material.

It is a further object of the present invention to provide an adhesive applicator unit of which the aforementioned roller is, on bodily motion thereof, turned about its own axis in an exceedingly simple structural manner, by carrying a pinion which is in mesh with a fixed rack.

Another object of the present invention is to provide an adhesive applicator unit of the aforementioned type of which the roller is carried by a cross-shaft which, in turn, is carried by and, hence, turns with a vertical drive shaft and is also independently rotatable about its own axis, and further carries a bevel pinion which is in mesh with a fixed bevel gear arranged concentrically of the drive shaft, so that the roller will, on being spun by the drive shaft in an orbital path thereabout, be simultaneously rotated about its own axis, thereby to adapt the unit for the application of a ring-shaped layer of adhesive to material.

Further object and advantages will appear to those skilled in the art from the following, considered in conjunction with the accompanying drawings.

In the accompanying drawings, in which certain modes of carrying out the present invention are shown for illustrative purposes:

Fig. 1 is a fragmentary top view of an adhesive applicator unit embodying the present invention, a top part of the applicator being removed to show normally hidden prominent parts of the latter;

Fig. 2 is a cross-section through the applicator unit as taken on the line 2—2 of Fig. 1;

Fig. 3 is a section similar to Fig. 2, and showing the applicator unit in operation;

Fig. 4 is a fragmentary section taken on the line 4—4 of Fig. 3;

Fig. 5 shows a piece of material to which adhesive has been applied by the instant applicator unit; and Fig. 6 shows a part of a modified adhesive applicator unit.

Referring to the drawings, and more particularly to Figs. 1 to 3 thereof, the reference numeral 10 designates an adhesive applicator which comprises an adhesive-applying roller 12, a material guide 14, roller-operating mechanism 16, and an adhesive supply reservoir 18 on a base plate or support 20.

The material to which adhesive is to be applied is in this instance strip material $s$ of any kind, and the same is passed through the guide 14 for the application of adhesive thereon. The guide 14 is, in the present instance, a slot formed by top and bottom plates 22 and 24 and interposed spacers 26 all of which are conveniently held together by screws 28 (Fig. 2). The guide 14 is held in vertically spaced relation with the base plate 20 by having its top plate 22 mounted, by bolts 30, for instance, on opposite upright walls 32 that may conveniently be bolted at 34 to the base plate 20. The bottom plate 24 is recessed at 36 for access of the adhesive-applying roller 12 to the material $s$ in the guide 14.

The roller-operating-mechanism 16 comprises an operating shaft 40 which is rotatable and axially movable in a bearing sleeve 42 on the base plate 20, and carries at its top end a head 44 in which is journalled a cross-shaft 46 that carries the roller 12. The head 44 has in this instance a threaded shank 48 by means of which it is mounted on the operating shaft 40, and the cross-shaft 46 is held against axial movement in the head 44 by a screw 50 which is received in the head 44 and has a blank end 52 projecting into a peripheral groove 54 in the cross-shaft 46 (Fig. 2). The operating shaft 40 is axially movable, as aforementioned, in order to move the roller 12 from its inoperative or repose position in Fig. 2 into its operative or adhesive-applying position in Fig. 3, and vice versa.

When the operating shaft 40 is turned, the roller 12 is moved bodily in an orbital or circular path about the axis of the operating shaft. In order to apply adhesive to the material $s$ with an advantageous wiping action as more fully described hereinafter, the roller 12 is also driven about its own axis. To this end, the cross-shaft 46 carries a bevel pinion 58 which meshes with a bevel gear 60 that is axially movable with the operating shaft 40 so as to remain in permanent mesh with the bevel pinion 58 in any axial position of the operating shaft. To this end, the bevel gear 60 is journalled on a diametrically reduced end length 62 of the operating shaft 40 and is retained thereon by the head 44 (Fig. 2). In order that the roller 12 will be driven about its own axis when the same is bodily moved in its orbital path on driving the operating shaft 40, the bevel gear 60 is held against rotation. To this end, the bevel gear 60 carries depending pins 64 which project into bores 66 in the fixed bearing sleeve 42 and thus form a spline connection between the latter and the bevel gear 60 which permits the aforementioned axial movement of the bevel gear with the operating shaft but holds the former against rotation.

The reservoir 18, which is adapted to hold a supply of adhesive $a$, is ring-shaped and its inner annular wall 70 surrounds the adjacent parts of the roller-operating mechanism 16 (Figs. 1 to 3). The adhesive supply in the reservoir is preferably kept at such a level that the roller 12 dips thereinto even when the latter is raised to its operative position (Fig. 3), so that adhesive is supplied to the roller while the latter applies adhesive to the material $s$.

Mounted on top of the head 44, conveniently by means of the screw 50, is a wiper blade 72 of which an edge 74 is so spaced from the adjacent periphery of the roller 12 as to wipe excess adhesive $a'$ from the latter, as shown in an exaggerated manner in Fig. 4, before the roller applies adhesive to the material $s$. To that end, the operating shaft 40 is, in the present instance, driven clockwise as viewed in Fig. 1 so that that part of the roller periphery which emerges from the adhesive supply in the reservoir 18 moves past the edge 74 of the wiper blade 72 and is relieved of its excess adhesive by the latter before the same applies adhesive to the material $s$ (Fig. 4). The edge 74 of the wiper blade 72 is in this instance the bottom edge of a slot 76 in the latter into which the roller 12 projects with clearance. The depth of the slot 76 and its clearance from the opposite sides of the roller 12, and the areal extent of the wiper blade 72, are such as to prevent adhesive from splashing above the wiper blade against the material $s$ despite the rotary and bodily motion of the roller and the agitation by it of the adhesive supply in the reservoir 18. The spacing of the edge 74 of the wiper blade 72 from the periphery of the roller 12 may be adjusted within limits by slightly turning the wiper blade on the head 44, as will be readily understood.

The applicator 10 is, in the present instance, adapted for applying ring-shaped adhesive coatings 80 (Fig. 5) to the material $s$ at spaced intervals thereof. To this end, a portion of the material $s$ to be coated is moved in the guide 14 until it is within the confines of the recess 36 in the plate 24 for access by the roller 12. The operating shaft 40 is then raised in any suitable manner, as by a hand crank (not shown) at its lower end, for instance, until the roller is in its operative position (Fig. 3). For a reason described hereinafter, the roller 12 is in its operative position preferably slightly spaced from the material $s$ (Fig. 3). To this end, the operating shaft 40 carries a stop collar 82 which engages the bearing sleeve 42 when the roller 12 is in its operative position. The stop collar 82 is preferably adjustable on the operating shaft 40 by means of a set screw 84 (Fig. 2) so as to permit variation of the spacing between the material $s$ and the roller 12 in the operative position of the latter. After raising the operating shaft 40 into the position shown in Fig. 3, the same may be driven in any suitable manner, as by the before-mentioned hand crank, for instance, clockwise as viewed in Fig. 1 in this instance for the correct performance of the wiper blade 72 as explained before. In thus turning the operating shaft 40 while the roller 12 is in its raised operative position, the latter is rotated in the direction of the arrow 86 in Fig. 4 and is also simultaneously moved bodily in its orbital path in the direction of the arrow 88 in Fig. 4, applying thereby to the material $s$ a ring-shaped adhesive coating 80 of uniform thickness (Fig. 5). After thus coating the material $s$ at one place, the operating shaft 40 may be lowered to return the roller 12 to its inoperative position, whereupon the material $s$ may be advanced in its guide 14 to bring another portion thereof into operative alignment with the roller 12 for coating by the latter in the same manner as described above.

The performance of the instant adhesive applicator is in accordance with a method of applying adhesive to material with an advantageous wiping action. This method contemplates relative bodily movement between the material and a roller with the roller periphery in close proximity to the material, and simultaneous rotation of the roller about its axis at a peripheral speed greater than that of the relative bodily movement between material and roller, and supplying the roller with adhesive during rotation of the latter and relative bodily movement between material and roller. In following this method, the adhesive is applied to material by a wiping action, rather than by a printing action, whereby the adhesive is deposited on even sharply defined areas of material in concentrated form in a uniform layer thereon. The manner in which adhesive is supplied to the roller is immaterial for the success of this method. Thus, the roller need not necessarily dip into an adhesive supply, since the same purpose would be served by spraying or dripping adhesive on the roller periphery, for instance. Further, the method contemplates not only bodily motion of the rotary roller against stationary material as in the instant applicator, but also bodily motion of the material against the rotary roller while the latter is bodily immovable. Also, while the roller of the exemplary applicator shown in the drawings and described herein has a bodily motion which is in an orbital path, the present method contemplates also rectilinear relative bodily motion between material and roller.

The present method also contemplates the before-mentioned slight spacing of the roller periphery from the material (Fig. 3). In doing so, the adhesive is in a sense wedged between the roller and the material and thus applied forcefully to the latter, and the before-mentioned wiping action is on the adhesive, rather than on the material itself, thereby achieving a measurable and most uniform thickness of the deposited adhesive on the material and also the application of the adhesive to sharply defined areas of the material, and subjecting the material to the negligible internal shearing stresses of the adhesive only and not to any direct stresses whatever from the acting roller.

The present method further contemplates relative bodily movement between material and roller in a direction opposite to that of the periphery of the rotating roller nearest the material, thereby to achieve the before-mentioned advantageous reverse roller coating of the material with adhesive in which the roller sweeps some of the delivered adhesive before it against the material to enhance the uniform application of adhesive to the material and especially achieve the deposition on the material of adhesive of maximum concentration. This aspect of the present method is indicated in the instant applicator in Fig. 4 in which the arrows 86 and 88 indicate the direction of rotation of the roller 12 and the bodily movement of the latter, respectively.

The combined rotary and bodily motion of the roller 12 in action agitates the adhesive supply in the reservoir 18 most forcefully, and thereby keeps the consistency of the adhesive supply substantially constant for a considerable length of time for optimum efficiency of the applicator even at exceptionally fast performance of the same.

While the roller 12 of the applicator 10 is, in the present instance, movable into and from operative or adhesive-applying position for applying adhesive coatings to spaced portions of the material in the guide, it is fully within the purview of the present invention to arrest the operating shaft 40 against axial movement and have the roller 12 constantly in operative position to apply a continuous coating of adhesive to material as the same is fed at a uniform speed through the guide 14.

The peripheral speed of the roller 12 is considerably greater than that of its orbital motion, as is evidenced by the fact that the bevel pinion is considerably smaller than the bevel gear 60. The ratio between the peripheral speed of the roller and that of its orbital motion may be increased or decreased, as desired, by changing the ratio of the gears 58, 60.

Fig. 6 shows a modified roller-operating mechanism 16' which distinguishes from the described mechanism 16 only in that the bevel pinion 58' is carried by the cross-shaft 46' on the same side of the operating shaft 40' on which the roller 12' is carried by the cross-shaft, and the wiper blade 72' is mounted in inverted fashion on the head 50'. In order that the wiper blade 72' may perform its designated function of removing excess adhesive from the roller 12' before the latter applies adhesive to material, the operating shaft 40' will have to be driven in clockwise direction as viewed in Fig. 6, but it will be noted that in this case the direction of movement of the top part of the periphery of the rotating roller coincides with the direction of its bodily movement as indicated by the arrows 100 and 102, respectively, in Fig. 6. In thus operating the roller 12', the same does not have the before-mentioned reverse roller coating action of the described roller 12, but will perform satisfactorily for many purposes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An adhesive applicator, comprising a support; a rotary roller; means for mounting said roller on said support for bodily movement relative to the latter; means operative on bodily movement of said roller for turning the latter at a peripheral speed greater than that of its bodily movement; means for bodily moving said roller; and a reservoir adapted to hold an adhesive supply, said roller projecting in any of its bodily positions into said reservoir to dip into adhesive therein.

2. An adhesive applicator as set forth in claim 1, in which said reservoir is stationary so that said roller will agitate adhesive in the former when the latter is moved and turned.

3. An adhesive applicator as set forth in claim 1, in which the rotary axis of said roller extends transversely of the direction of its bodily movement.

4. An adhesive applicator, comprising a support; a rotary roller having a substantially horizontal axis; means for mounting said roller on said support for substantially horizontal bodily movement relative to the latter; means operative on bodily movement of said roller for turning the latter at a peripheral speed greater than that of its bodily movement; means for bodily moving said roller; and a reservoir adapted to hold an adhesive supply, said roller projecting in any of its bodily positions with its periphery into said reservoir to dip into adhesive therein.

5. An adhesive applicator as set forth in claim 4, in which the rotary axis of said roller extends transversely of the direction of its bodily movement, and said roller turning means is arranged so that the part of the roller periphery most remote from said reservoir turns counter to the direction of bodily movement of said roller.

6. An adhesive applicator, comprising a support; a rotary roller; means for mounting said roller on said support for bodily movement at right angles to the roller axis; meshing gear and rack members carried by said roller and support, respectively, for turning said roller on bodily movement of the latter; means for bodily moving said roller; and a reservoir adapted to hold an adhesive supply, said roller projecting in any of its bodily positions into said reservoir to dip into adhesive therein.

7. An adhesive applicator, comprising a support; a roller; a carrier on which said roller is rotatably mounted on said support to impart bodily movement to said roller; means operative on movement of said carrier for turning said roller at a peripheral speed greater than that of its bodily movement; means for moving said carrier; a reservoir adapted to hold an adhesive supply, said roller projecting in any of its bodily positions into said reservoir to dip into adhesive therein; and a wiper blade mounted on said carrier and so spaced from said roller as to wipe off adhesive thereon in excess of a predetermined thickness thereof.

8. An adhesive applicator as set forth in claim 7, in which said roller projects with its periphery into said reservoir, and said wiper blade is spaced from said roller periphery to regulate the thickness of the adhesive to be applied.

9. An adhesive applicator as set forth in claim 7, in which said wiper blade is adjustably mounted on said carrier for variably spacing the former from said roller.

10. An adhesive applicator, comprising a support; a guide above said support for strip material to which adhesive is to be applied; a roller; a carrier on which said roller is mounted for rotation about its own axis, said carrier being movably mounted on said support to impart a first bodily movement to said roller in a plane parallel to material in said guide, said carrier being also liftable away from and descendible toward said support for bodily moving said roller into and from adhesive-applying relation, respectively, with material in said guide; means, operative on movement of said carrier for causing said first bodily roller movement, to turn said roller in any of its bodily positions at a peripheral speed greater than that of said first bodily movement thereof; means for moving said carrier, to impart said first bodily movement to said roller, and for lifting said carrier; and a reservoir adapted to hold an adhesive supply, said roller projecting in any of its bodily positions into said reservoir to dip into adhesive therein.

11. An adhesive applicator as set forth in claim 10, further providing stop means limiting the lift of said carrier so that said roller is in its adhesive-applying position slightly spaced from material in said guide.

12. An adhesive applicator as set forth in claim 10, further providing adjustable stop means limiting the lift of said carrier so that said roller is in its adhesive-applying position variably spaced from material in said guide.

13. An adhesive applicator, comprising a support; a rotary roller; means for mounting said roller on said support for bodily movement in an orbital path about an axis; means operative on orbital movement of said roller for turning the latter at a peripheral speed greater than that of its orbital movement; means for moving said roller in said orbital path; and a reservoir adapted to hold an adhesive supply from which to apply adhesive to said roller by dipping when the latter is moved and turned.

14. An adhesive applicator, comprising a support; a rotary roller; means for mounting said roller on said support for bodily movement in an orbital path about a substantially vertical axis; means operative on orbital movement of said roller for turning the latter at a peripheral speed greater than that of its orbital movement; means for moving said roller in said orbital path; and a reservoir adapted to hold an adhesive supply, said roller projecting in any of its bodily positions into said reservoir to dip into adhesive therein.

15. An adhesive applicator, comprising a support; a rotary roller; means for mounting said roller on said support for movement of the former in an orbital path about a non-horizontal axis at right angles to said roller axis; meshing bevel pinion and bevel gear members carried by said roller and support, respectively, for turning said roller on orbital movement of the same; means for moving said roller in said orbital path; and a reservoir adapted to hold an adhesive supply from which to apply adhesive to said roller by dipping when the latter is moved and turned.

16. An adhesive applicator, comprising a support; a roller; a carrier on which said roller is rotatably mounted with its axis extending non-vertically, said carrier being mounted on said support for rotation about a non-horizontal axis to impart to said roller bodily movement in an orbital path about the rotary axis of said carrier; means operative on uni-directional rotation of said carrier for turning said roller uni-directionally at a peripheral speed greater than that of its bodily movement; means for turning said carrier in one direction; a reservoir adapted to hold an adhesive supply from which to apply adhesive to said roller by dipping when the latter is moved and turned; and a wiper blade mounted on said carrier and so spaced from the part of the roller on that side of its axis which during rotation of the latter emerges from the reservoir to wipe from said roller adhesive in excess of a predetermined thickness thereof.

17. An adhesive applicator, comprising a support; a roller; a carrier mounted on said support for rotation about a non-horizontal axis, said roller being rotatably mounted on said carrier with its axis extending non-vertically and transversely of the rotary axis of said carrier, and said roller being bodily moved in an orbital path about the rotary axis of said carrier when the latter is rotated; means operative on uni-directional rotation of said carrier for turning said roller uni-directionally at a peripheral speed greater than that of its orbital movement and so that the uppermost part of the roller periphery turns counter to the direction of the orbital movement of said roller; means for turning said carrier; and a reservoir adapted to hold an adhesive supply from which to apply adhesive to said roller by dipping when the latter is moved and turned.

18. An adhesive applicator, comprising a support; a guide above said support for strip material to which adhesive is to be applied; a roller; a carrier on which said roller is rotatably mounted with its axis extending non-vertically, said carrier being mounted on said support for rotation about an axis at right angles to material in said guide to impart a first bodily movement to said roller in an orbital path about the rotary axis of said carrier, said carrier being also axially movable for bodily moving said roller into and from adhesive-applying relation with material in said guide; means operative on rotation of said carrier for turning said roller in any of its bodily positions at a peripheral speed greater than that of its orbital movement; means for turning and axially moving said carrier; and a reservoir adapted to hold an adhesive supply, said roller projecting in any of its bodily positions into said reservoir to dip into adhesive therein.

19. An adhesive applicator as set forth in claim 18, further comprising stop means limiting axial movement of said carrier toward said guide so that said roller is in its adhesive-applying position slightly spaced from material in said guide.

20. In an adhesive applicator, the combination of a support; a first rotary shaft journalled in said support and extending thereabove; a cross-shaft journalled in said first shaft above said support and held against axial movement therein; a roller carried by said cross-shaft so that the former has an orbital movement about the rotary axis of said first shaft when the latter is turned; a first bevel gear mounted on said support concentrically of said first shaft; another bevel gear carried by said cross-shaft and in permanent mesh with said first bevel gear so that said cross-shaft is, on rotation of said first shaft, driven about its own axis; and a ring-shaped reservoir on said support surrounding said first shaft and adapted to hold an adhesive supply, said roller projecting with its periphery into said reservoir to dip into adhesive therein.

21. The combination in an adhesive applicator as set forth in claim 20, in which said other bevel gear is a bevel pinion of smaller size than said first bevel gear.

22. The combination in an adhesive applicator as set forth in claim 20, in which said roller and said other bevel gear are carried by said cross-shaft on opposite sides, respectively, of said first shaft.

23. The combination in an adhesive applicator as set forth in claim 20, in which said roller and said other bevel gear are carried by said cross-shaft on one side of said first shaft.

24. The combination in an adhesive applicator as set forth in claim 20, further comprising a wiper blade mounted on said first shaft and so spaced from the periphery of said roller at one side of the rotary axis of said cross-shaft as to wipe from the roller periphery adhesive in access of a predetermined thickness thereof.

25. The combination in an adhesive applicator as set forth in claim 20, further comprising a wiper blade adjustably mounted on said first shaft for its variable spacing from the periphery of said roller at one side of the rotary axis of said cross-shaft to wipe from the roller periphery adhesive in access of a variable thickness thereof.

26. In an adhesive applicator, the combination of a support; a guide above said support for strip material to which adhesive is to be applied; a first rotary shaft journalled and axially movable in said support at right angles to material in said guide and projecting above said support; a cross-shaft journalled in said first shaft above said support and held against axial movement therein; a roller carried by said cross-shaft so that the former has an orbital movement about the rotary axis of said first shaft when the latter is turned, and said roller is moved into and from adhesive-applying relation with material in said guide when said first shaft is axially moved; a bevel gear axially movable with and arranged concentrically of said first shaft and splined to said support so as to be non-rotary; a bevel pinion carried by said cross-shaft and in permanent mesh with said bevel gear so that said cross-shaft is driven about its own axis on rotation of said first shaft in any axial position; and a ring-shaped reservoir on said support surrounding said first shaft and adapted to hold an adhesive supply, the roller periphery projecting in any axial position of said first shaft into said reservoir to dip into adhesive therein.

27. The combination in an adhesive applicator as set forth in claim 26, further comprising a stop on said first shaft cooperating with said support to limit axial upward movement of the former so that said roller is in its adhesive-applying position slightly spaced from material in said guide.

28. In an adhesive applicator, the combination of a reservoir adapted to hold a supply of adhesive; a carrier rotary about a substantially vertical axis; a roller rotatably mounted on said carrier with its axis extending non-vertically, said roller being bodily moved in an orbital path about the rotary axis of said carrier when the latter is rotated, and said roller projecting with the lower part of its periphery into said reservoir to dip into adhesive therein; a blade mounted on said carrier and having above said lower part of the roller periphery a slot into which said roller projects; means operative on uni-directional rotation of said carrier to turn said roller uni-directionally at a peripheral speed greater than that of its orbital motion; and means for driving said carrier in such direction that the roller periphery emerging from said reservoir passes through said slot in said blade, said slot having clearance from said roller to wipe excess adhesive from the latter and said blade serving as a shield to prevent splashing of adhesive thereabove.

29. A method of applying adhesive to material, comprising the steps of relatively bodily moving the material and a roller with the roller periphery in close proximity to the material, and simultaneously rotating the roller about its axis at a peripheral speed greater than that of the relative bodily motion between material and roller; and supplying the roller with adhesive during rotation of the roller and relative bodily movement between material and roller.

30. A method of applying adhesive to material as set forth in claim 29, in which the roller periphery is held slightly spaced from the material so that only adhesive on the former will contact the latter.

31. A method of applying adhesive to material, comprising the steps of relatively bodily moving the material and a roller in a direction transversely of the axis of the roller with the periphery of the latter in close proximity to the material, and simultaneously rotating the roller about its axis at a peripheral speed greater than that of the relative bodily motion between material and roller; and supplying the roller with adhesive during rotation of the roller and relative bodily movement between material and roller.

32. A method of applying adhesive to material as set forth in claim 31, in which the roller is turned so that its periphery closest to the material moves counter to the direction of relative bodily movement between material and roller.

33. A method of applying adhesive to material, comprising the steps of bodily moving a roller relative to the material with its periphery in close proximity to the latter, and simultaneously rotating the roller about its axis at a peripheral speed greater than that of its bodily motion; and supplying the roller with adhesive during its rotation and bodily motion.

34. A method of applying adhesive to material, comprising the steps of bodily moving a roller relative to the material in a direction transversely of its axis and with its periphery in close proximity to the material, and simultaneously rotating the roller about its axis at a peripheral speed greater than that of its bodily motion; and supplying the roller with adhesive during its rotation and bodily motion.

35. A method of applying adhesive to material as set forth in claim 34, in which the roller is turned so that its periphery closest to the material moves counter to the direction of bodily motion of the roller.

36. An adhesive applicator, comprising a support; a rotary roller; means for mounting said roller on said support for bodily movement relative to the latter; means operative on bodily movement of said roller for turning the latter at a peripheral speed greater than that of its bodily movement; means for bodily moving said roller; and means for supplying adhesive to said roller.

References Cited in the file of this patent

UNITED STATES PATENTS

| | | |
|---|---|---|
| 279,219 | Brown | June 12, 1883 |
| 1,187,801 | Armstrong | June 20, 1916 |
| 1,899,941 | Card | Mar. 7, 1933 |